United States Patent
Liao et al.

(10) Patent No.: US 9,788,208 B2
(45) Date of Patent: Oct. 10, 2017

(54) APPARATUSES AND METHODS FOR RECOVERING FROM SECURITY MODE COMMAND FAILURES

(71) Applicant: MediaTek Inc., Hsin-Chu (TW)

(72) Inventors: Shih-Chieh Liao, Kaohsiung (TW); Tuan-Che Chen, Taichung (TW)

(73) Assignee: MEDIATEK INC., Hsin-Chu (TW)

(*) Notice: Subject to any disclaimer, the term of this patent is extended or adjusted under 35 U.S.C. 154(b) by 0 days.

(21) Appl. No.: 14/986,230

(22) Filed: Dec. 31, 2015

(65) Prior Publication Data

US 2017/0195882 A1  Jul. 6, 2017

(51) Int. Cl.
*H04M 1/66* (2006.01)
*H04W 12/08* (2009.01)
*H04W 76/04* (2009.01)

(52) U.S. Cl.
CPC ......... *H04W 12/08* (2013.01); *H04W 76/046* (2013.01)

(58) Field of Classification Search
CPC ..... H04W 12/00; H04W 12/04; H04W 12/06; H04W 12/08; H04W 12/10; H04W 36/00; H04W 36/08; H04W 36/16
USPC .......................................... 455/410, 411, 436
See application file for complete search history.

(56) References Cited

U.S. PATENT DOCUMENTS

| | | | | |
|---|---|---|---|---|
| 2007/0026887 A1* | 2/2007 | Voyer | ................ | H04W 36/0055 455/525 |
| 2009/0320100 A1* | 12/2009 | Kitazoe | ................ | H04L 1/1607 726/3 |
| 2013/0148490 A1* | 6/2013 | Yi | .......................... | H04B 7/155 370/216 |
| 2015/0057002 A1* | 2/2015 | Lee | ........................ | H04W 36/06 455/437 |
| 2016/0205661 A1* | 7/2016 | Ryu | ....................... | H04W 36/30 455/458 |
| 2016/0309379 A1* | 10/2016 | Pelletier | .............. | H04W 76/022 |
| 2016/0338138 A1* | 11/2016 | Pelletier | ................ | H04W 74/04 |

* cited by examiner

*Primary Examiner* — Temica M Beamer
(74) *Attorney, Agent, or Firm* — McClure, Qualey & Rodack, LLP

(57) ABSTRACT

A mobile communication device including a wireless transceiver and a controller is provided. The wireless transceiver performs wireless transmission and reception to and from a service network. The controller determines, during an ongoing Non-Access Stratum (NAS) procedure, whether a SECURITY MODE COMMAND message received from the service network via the wireless transceiver fails an integrity protection check and no RRC CONNECTION RELEASE message has been received from the service network via the wireless transceiver, or whether transmission of a SECURITY MODE COMPLETE message to the service network via the wireless transceiver has failed. Also, the controller locally releases a connection to the service network when the SECURITY MODE COMMAND message fails the integrity protection check and no RRC CONNECTION RELEASE message has been received, or when the transmission of the SECURITY MODE COMPLETE message has failed.

20 Claims, 6 Drawing Sheets

… (1)

APPARATUSES AND METHODS FOR RECOVERING FROM SECURITY MODE COMMAND FAILURES

BACKGROUND OF THE APPLICATION

Field of the Application

The application generally relates to the handling of security mode command, and more particularly, to apparatuses and methods for recovering from security mode command failures.

Description of the Related Art

Due to the growing demand for ubiquitous computing and networking, various cellular technologies have recently been developed, including the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA2000) technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, and LTE-Advanced (LTE-A) technology, etc.

According to the 3rd Generation Partnership Project (3GPP) Technical Specification (TS) 36.331, an Evolved-Universal Terrestrial Radio Access Network (E-UTRAN) may activate security by sending a Security Mode Command message which is integrity protected. Assuming that the security activation will not go wrong, the E-UTRAN may subsequently initiate establishment of the Signaling Radio Bearer 2 (SRB2) and Data Radio Bearers (DRBs) before receiving a confirmation of the security activation from the User Equipment (UE). However, there are situations where the Security Mode Command message may not pass the integrity protection check by the UE, i.e., the security activation may fail, which further causes the failure of the radio bearer establishment. In some field trials, the E-UTRAN may not always release the Radio Resource Control (RRC) connection with the UE, as it should, when it knows that the security activation and/or the radio bearer establishment has/have failed.

In such cases, according to the 3GPP TS 24.301, the UE has to wait until expiry of the guard timer of the Non-Access Stratum (NAS) procedure which triggers the security activation. Upon expiry of the guard timer, the UE starts the retry timer and retries the NAS procedure when the retry timer expires. The UE may have to wait for a long time before it can be released from a state wherein it is stocked and cannot do anything. As a result, the user will inevitably experience no service for a long time.

BRIEF SUMMARY OF THE APPLICATION

In a first aspect of the application, a mobile communication device comprising a wireless transceiver and a controller is provided. The wireless transceiver is configured to perform wireless transmission and reception to and from a service network. The controller is configured to determine, during an ongoing Non-Access Stratum (NAS) procedure, whether a SECURITY MODE COMMAND message received from the service network via the wireless transceiver fails an integrity protection check and no RRC CONNECTION RELEASE message has been received from the service network via the wireless transceiver, or whether transmission of a SECURITY MODE COMPLETE message to the service network via the wireless transceiver has failed, and locally release a connection to the service network when the SECURITY MODE COMMAND message fails the integrity protection check and no RRC CONNECTION RELEASE message has been received, or when the transmission of the SECURITY MODE COMPLETE message has failed.

In a second aspect of the application, a method for recovering from security mode command failures, which is executed by a mobile communication device wirelessly communicating with a service network, is provided. The method comprises the steps of: determining, during an ongoing NAS procedure, whether a SECURITY MODE COMMAND message received from the service network fails an integrity protection check and no RRC CONNECTION RELEASE message has been received from the service network, or whether transmission of a SECURITY MODE COMPLETE message to the service network has failed; and locally releasing a connection to the service network when the SECURITY MODE COMMAND message fails the integrity protection check and no RRC CONNECTION RELEASE message has been received, or when the transmission of the SECURITY MODE COMPLETE message has failed.

In a third aspect of the application, a mobile communication device comprising a wireless transceiver and a controller is provided. The wireless transceiver is configured to perform wireless transmission and reception to and from a service network. The controller is configured to determine, during an ongoing NAS procedure, whether a SECURITY MODE COMMAND message received from the service network via the wireless transceiver fails an integrity protection check and an RRC CONNECTION RELEASE message has been received from the service network via the wireless transceiver, and when the SECURITY MODE COMMAND message fails the integrity protection check and the RRC CONNECTION RELEASE message has been received, release a connection to the service network according to the RRC CONNECTION RELEASE message and retry the NAS procedure without waiting for one or more timers associated with the NAS procedure to expire.

In a fourth aspect of the application, a method for recovering from security mode command failures, which is executed by a mobile communication device wirelessly communicating with a service network, is provided. The method comprises the steps of: determining, during an ongoing NAS procedure, whether a SECURITY MODE COMMAND message received from the service network fails an integrity protection check and an RRC CONNECTION RELEASE message has been received from the service network; and releasing a connection to the service network according to the RRC CONNECTION RELEASE message and retrying the NAS procedure without waiting for one or more timers associated with the NAS procedure to expire, when the SECURITY MODE COMMAND message fails the integrity protection check and the RRC CONNECTION RELEASE message has been received.

Other aspects and features of the present application will become apparent to those with ordinarily skill in the art upon review of the following descriptions of specific embodiments of the mobile communication devices and the methods for recovering from security mode command failures.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The 3GPP specifications are used to teach the spirit of the application, and the application is not limited thereto.

Figure 1:
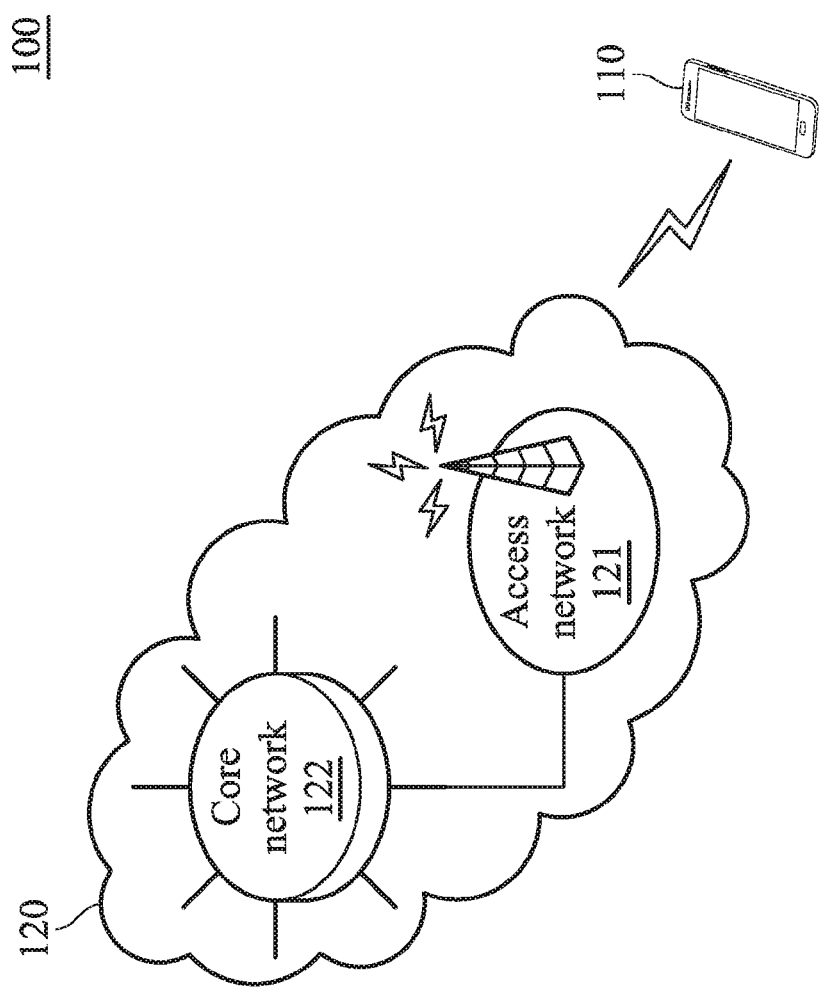
FIG. 1 is a block diagram of a wireless communication environment according to an embodiment of the invention.

FIG. 1 is a block diagram of a wireless communication environment according to an embodiment of the invention. The wireless communication environment 100 comprises a mobile communication device 110 and a service network 120, wherein the mobile communication device 110 is wirelessly connected to the service network 120 for obtaining mobile services. The mobile communication device 110 may be a feature phone, a smartphone, a panel Personal Computer (PC), a laptop computer, or any computing device supporting the wireless technology utilized by the service network 120.

Specifically, the service network 120 comprises an access network 121 and a core network 122, wherein the access network 121 is responsible for processing radio signals, terminating radio protocols, and connecting the mobile communication device 110 with the core network 122, while the core network 122 is responsible for performing mobility management, network-side authentication, and interfaces with public/external networks (e.g., the Internet). Each of the access network 121 and the core network 122 may comprise one or more network nodes for carrying out said functions. For example, if the service network 120 is an LTE/LTE-A/TD-LTE network, the access network 121 may be an Evolved-UTRAN (E-UTRAN) which includes at least an evolved NB (eNB), and the core network 122 may be an Evolved Packet Core (EPC) which includes a Home Subscriber Server (HSS), Mobility Management Entity (MME), Serving Gateway (S-GW), and Packet Data Network Gateway (PDN-GW or P-GW). If the service network 120 is a WCDMA network, the access network 121 may be a UTRAN which includes at least a Node B and a Radio Network Controller (RNC), and the core network may be a GPRS core which includes at least a Home Location Register (HLR), at least one Serving GPRS Support Node (SGSN), at least one Gateway GPRS Support Node (GGSN).

Figure 2:
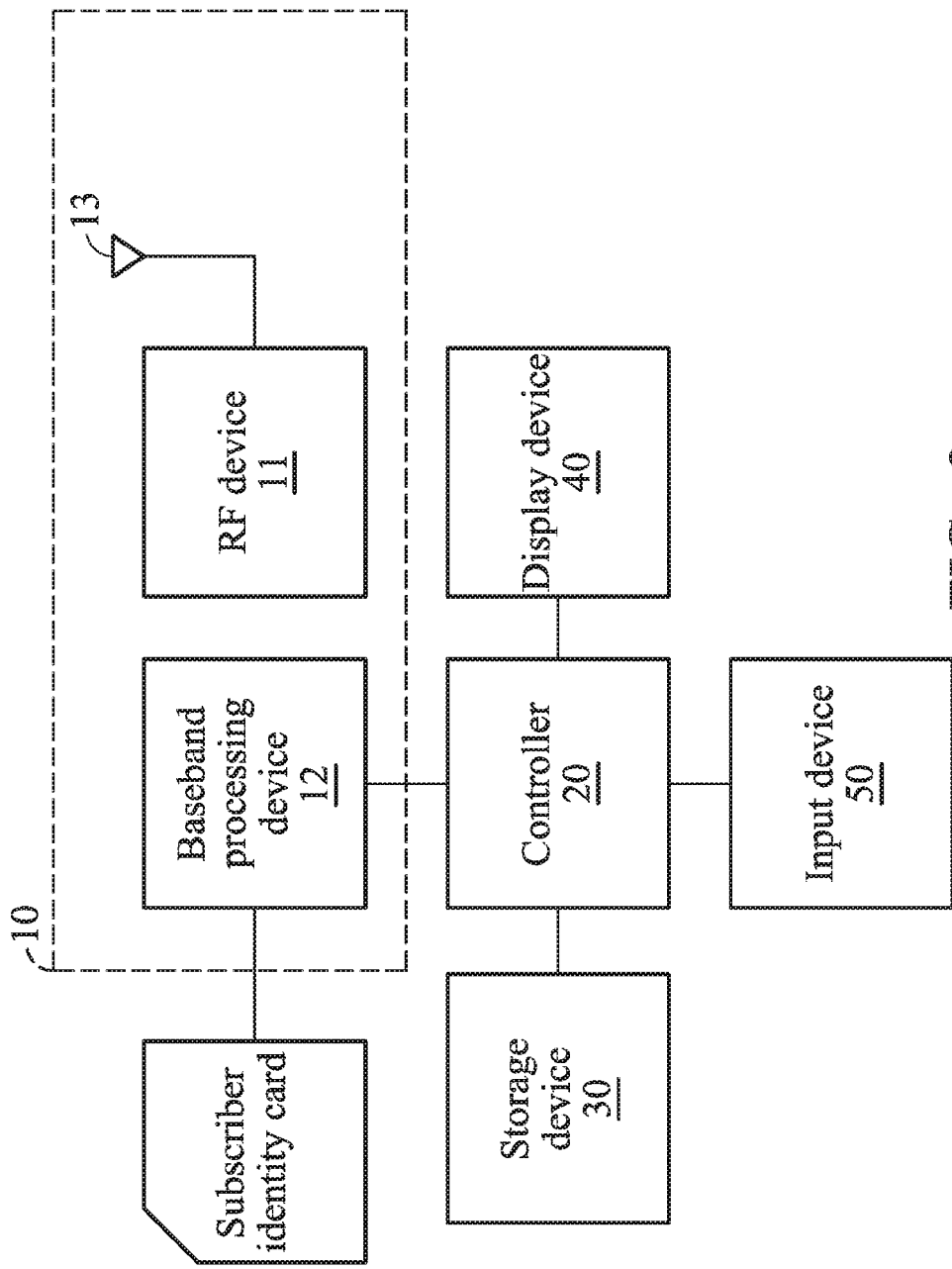
FIG. 2 is a block diagram illustrating the mobile communication device 110 according to an embodiment of the application.

FIG. 2 is a block diagram illustrating the mobile communication device 110 according to an embodiment of the application. The mobile communication device 110 comprises a wireless transceiver 10, a controller 20, a storage device 30, a display device 40, and an input device 50. The wireless transceiver 10 is configured to perform wireless transmission and reception to and from the service network 120. The wireless transceiver 10 comprises a Radio Frequency (RF) device 11, a baseband processing device 12, and an antenna 13. The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna 13, convert the received RF wireless signals to baseband signals, which are processed by the baseband processing device 12, or receive baseband signals from the baseband processing device 12 and convert the received baseband signals to RF wireless signals, which are later transmitted via the antenna 13. The RF device 11 may also contain multiple hardware devices to perform radio frequency conversion. For example, the RF device 11 may comprise a mixer to multiply the baseband signals with a carrier oscillated in the radio frequency of the supported cellular technologies, wherein the radio frequency may be 900 MHz, 1900 MHz or 2100 MHz utilized in WCDMA technology, or may be 900 MHz, 2100 MHz, or 2.6 GHz utilized in LTE/LTE-A/TD-LTE technology, or another radio frequency, depending on the cellular technology in use.

The controller 20 may be a general-purpose processor, a Micro Control Unit (MCU), an application processor, a Digital Signal Processor (DSP), or the like, for controlling the wireless transceiver 10 for wireless communications with the service networks 120 and 130, storing and retrieving data to and from the storage device 30, sending a series of frame data (e.g. representing text messages, graphics, images, etc.) to the display device 40, receiving signals from the input device 50. In particular, the controller 20 coordinates the aforementioned operations of the wireless transceiver 10, the storage device 30, the display device 40, and the input device 50 for performing the method for recovering from security mode command failures.

In another embodiment, the controller 20 may be incorporated into the baseband processing device 12, serving as a baseband processor.

The storage device 30 may be a memory, such as a FLASH memory or a Non-volatile Random Access Memory (NVRAM), or a magnetic storage device, such as a hard disk or a magnetic tape, or an optical disc, or any combination thereof for storing cell information of legacy networks (e.g., the service network 130) and instructions and/or program code of applications and/or communication protocols.

The display device 40 may be a Liquid-Crystal Display (LCD), Light-Emitting Diode (LED) display, or Electronic Paper Display (EPD), etc., for providing a display function. Alternatively, the display device 40 may further comprise one or more touch sensors disposed thereon or thereunder for sensing touches, contacts, or approximations of objects, such as fingers or styluses.

The input device 50 may comprise one or more buttons, a keyboard, a mouse, a touch pad, a video camera, a microphone, and/or a speaker, etc., serving as the Man-Machine Interface (MIMI) for interaction with users.

It should be understood that the components described in the embodiment of FIG. 2 are for illustrative purposes only and are not intended to limit the scope of the application.

Figure 3A:
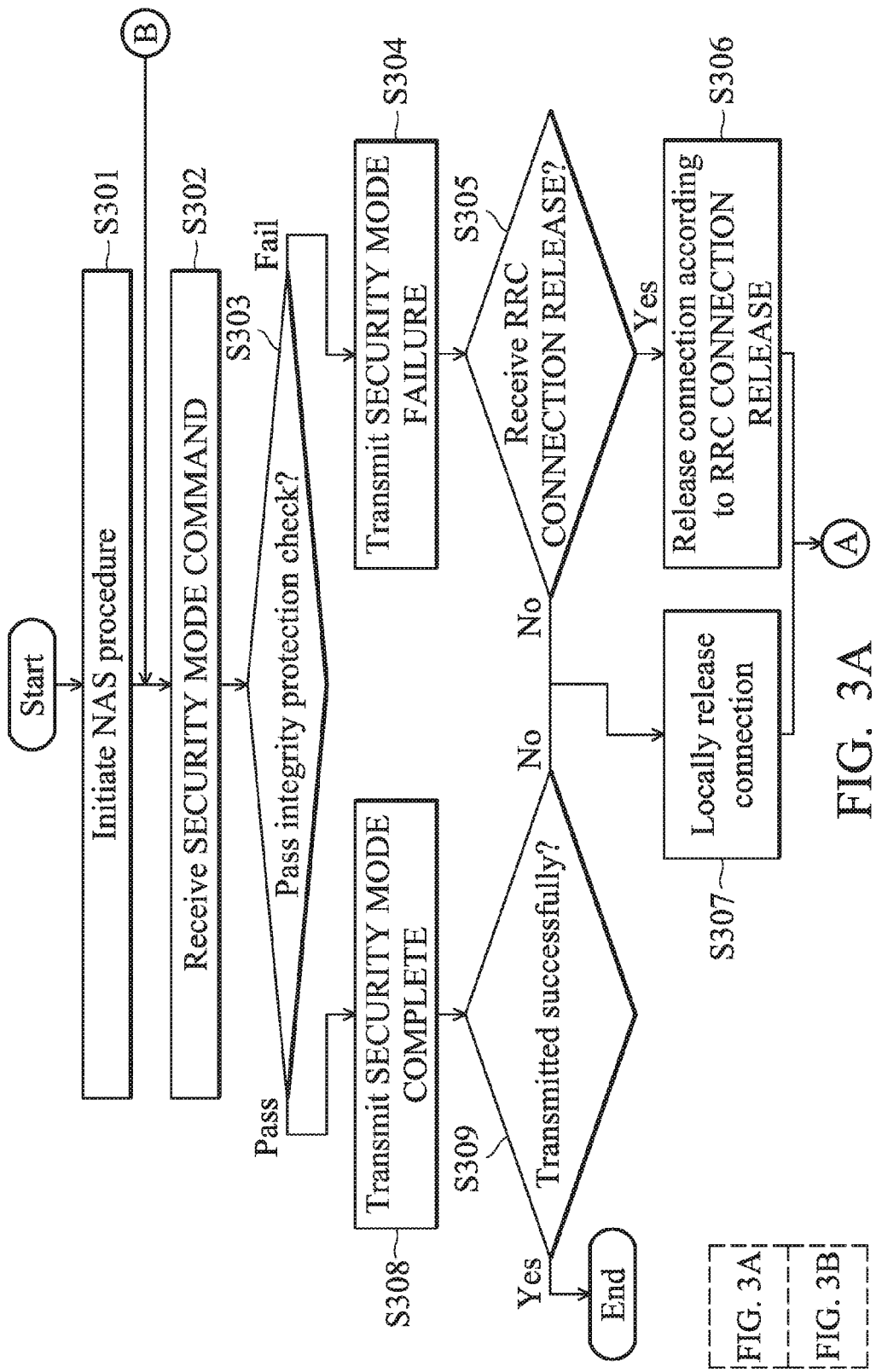
FIGS. 3A and 3B show a flow chart illustrating the method for recovering from security mode command failures according to an embodiment of the application.
Figure 3B:
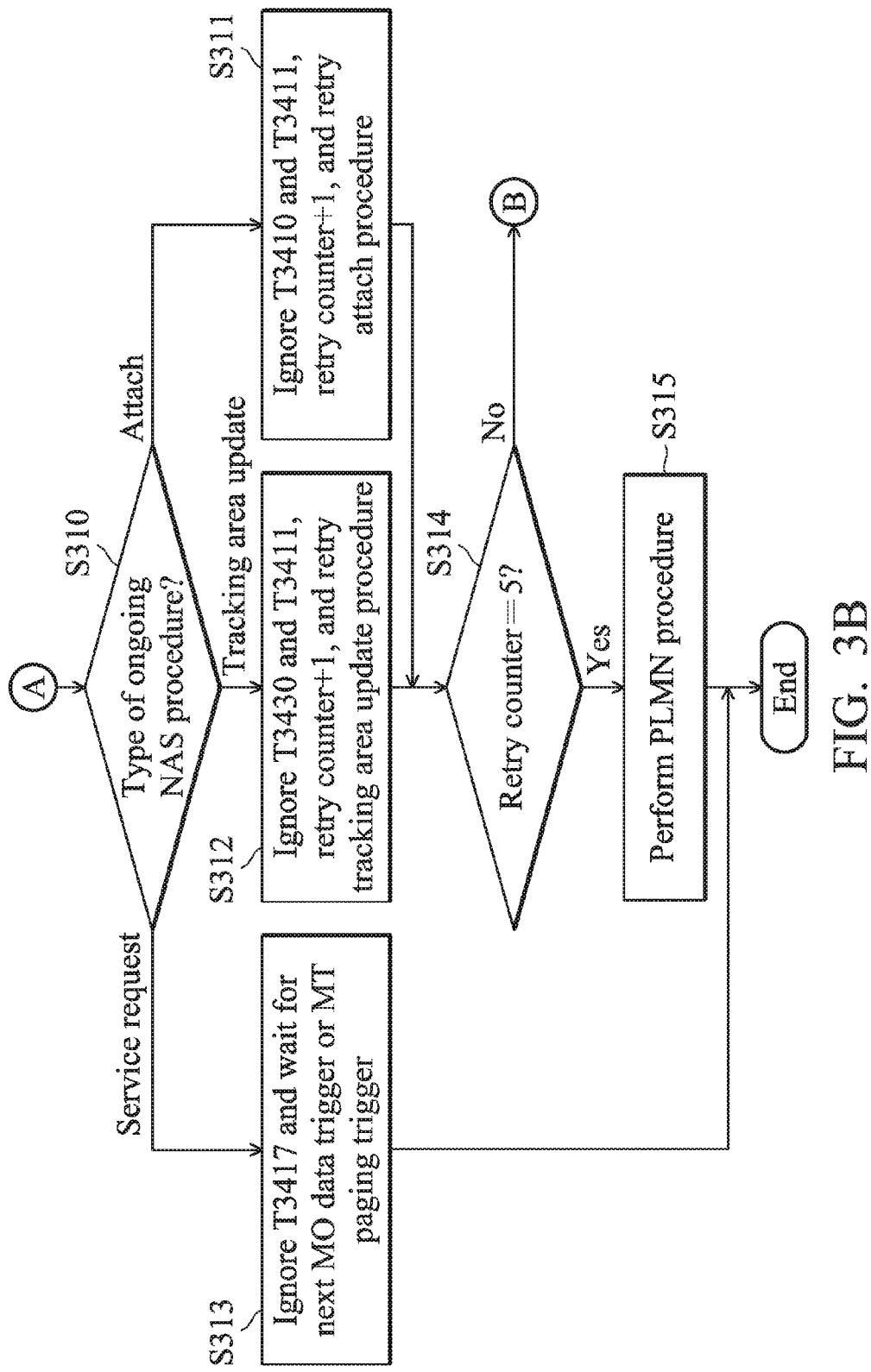

FIGS. 3A and 3B show a flow chart illustrating the method for recovering from security mode command failures according to an embodiment of the application. In this embodiment, the method for recovering from security mode command failures is executed by a mobile communication device, e.g., the mobile communication device 110, which communicates wirelessly with a service network, e.g., the service network 120. To begin, the mobile communication device initiates a NAS procedure (step S301). The NAS procedure may be an attach procedure, a tracking area update procedure, or a service request procedure. Specifically, the mobile communication device may initiate the NAS procedure by transmitting an ATTACH REQUEST message, a TRACKING AREA UPDATE REQUEST message, or a SERVICE REQUEST message to the service network.

Next, the mobile communication device receives a SECURITY MODE COMMAND message from the service network for security activation (step S302), and determines whether the SECURITY MODE COMMAND message passes the integrity protection check (step S303). Specifically, the SECURITY MODE COMMAND message is an RRC message, and is integrity protected. In one embodiment, the service network uses a security key to hash the content of the SECURITY MODE COMMAND message to generate a Message Authentication Code-Integrity (MAC-I), and the SECURITY MODE COMMAND message is sent with the MAC-I. When receiving the SECURITY MODE COMMAND message, the mobile communication device uses the same security key to hash the content of the received SECURITY MODE COMMAND message to generate another MAC-I, and compares this MAC-I to the one received with the SECURITY MODE COMMAND message. If the two MAC-Is match, the integrity protection check is passed, and otherwise, the integrity protection check fails.

Subsequent to step S303, if the SECURITY MODE COMMAND message fails the integrity protection check, the mobile communication device transmits a SECURITY MODE FAILURE message to the service network (step S304), and then determines whether an RRC CONNECTION RELEASE message has been received from the service network during a predetermined period of time (step S305). In one embodiment, the mobile communication device may start a timer to count the predetermined period of time after the SECURITY MODE FAILURE message is transmitted successfully, and alerts the mobile communication device when the timer expires. For example, the predetermined period of time may be set to 1 second.

Subsequent to step S305, if an RRC CONNECTION RELEASE message is received during the predetermined period of time, the mobile communication device releases the current connection to the service network according to the RRC CONNECTION RELEASE message (step S306). Otherwise, if no RRC CONNECTION RELEASE message has been received during the predetermined period of time, the mobile communication device immediately performs local release of the current connection to the service network (step S307).

Subsequent to step S303, if the SECURITY MODE COMMAND message passes the integrity protection check, the mobile communication device transmits a SECURITY MODE COMPLETE message to the service network (step S308), and then determines whether the SECURITY MODE COMPLETE message has been transmitted successfully to the service network (step S309). If the SECURITY MODE COMPLETE message has been transmitted successfully, the method ends. Otherwise, if the transmission of the SECURITY MODE COMPLETE message has failed, the method flow goes to step S307. In one embodiment, it is determined that the SECURITY MODE COMPLETE message has been transmitted successfully if a Radio Link Control (RLC) Acknowledgement (Ack) of the SECURITY MODE COMPLETE message has been received from the service network. In another embodiment, it is determined that the transmission of the SECURITY MODE COMPLETE message has failed if the maximum number of retransmissions of the SECURITY MODE COMPLETE message in the RLC layer is reached.

Subsequent to steps S306 and S307, it is determined whether the NAS procedure is an attach procedure, a tracking area update procedure, or a service request procedure (step S310). If the NAS procedure is an attach procedure, the mobile communication device ignores the guard timer, T3410, and the retry timer, T3411, increments the retry counter (i.e., increases the retry counter by one), and immediately retries the attach procedure (step S311). If the NAS procedure is a tracking area update procedure, the mobile communication device ignores the guard timer, T3430, and the retry timer, T3411, increments the retry counter, and immediately retries the tracking area update procedure (step S312). If the NAS procedure is a service request procedure, the mobile communication device ignores the guard timer, T3417, and waits for the next Mobile Originated (MO) data trigger or Mobile Terminated (MT) paging trigger for initiating the service request procedure (step S313), and the method ends.

Subsequent to steps S311 and S313, the mobile communication device determines whether the attempt counter of the NAS procedure has a value equal to or greater than 5 (i.e., the maximum number of retries) (step S314), and if so, performs a Public Land Mobile Network (PLMN) procedure according to the 3GPP TS 24.301 (step S315), and the method ends. Otherwise, if the attempt counter of the NAS procedure has a value less than 5, the method flow goes to step S302.

Figure 4A:
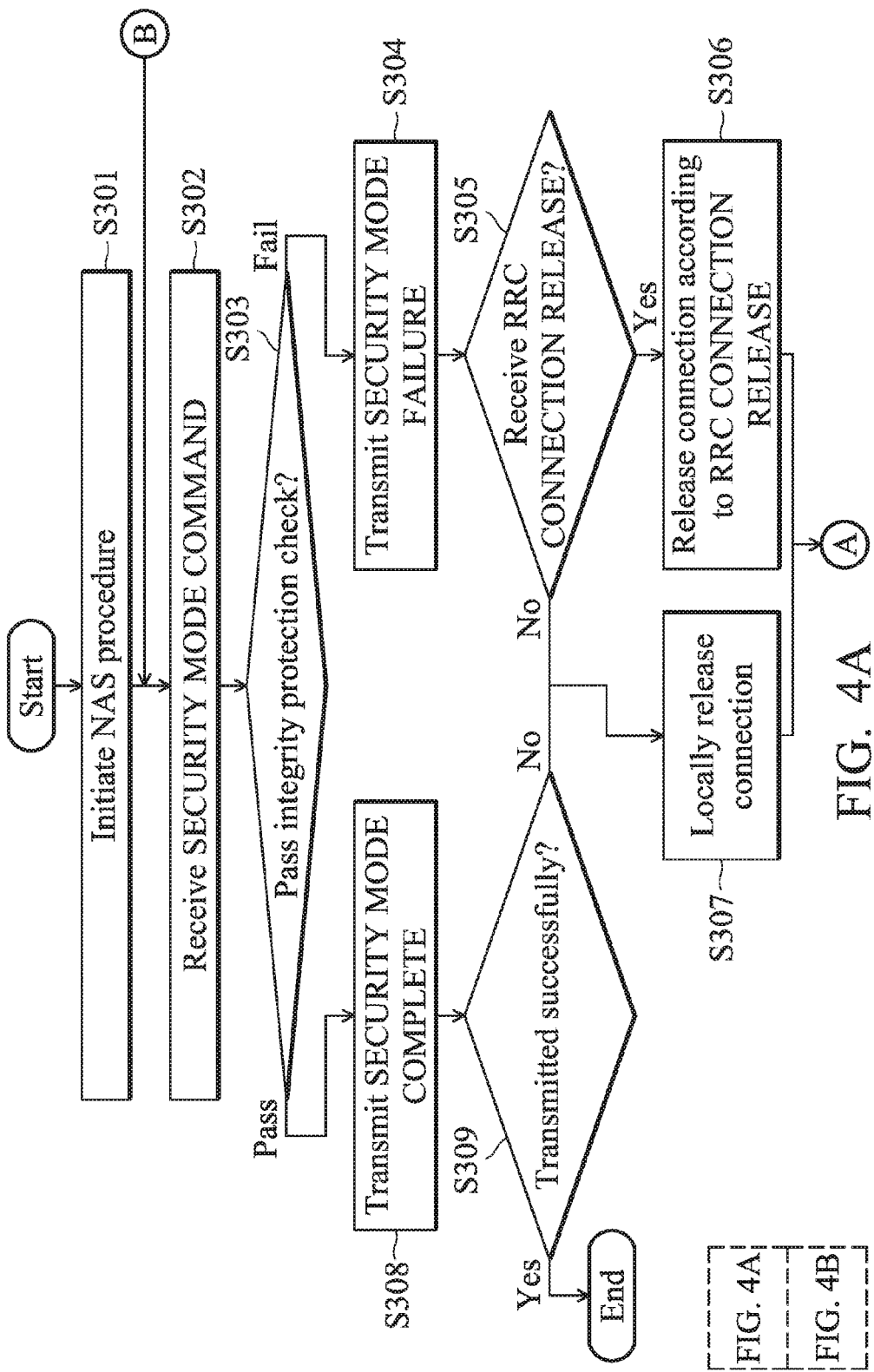
FIGS. 4A and 4B show a flow chart illustrating the method for recovering from security mode command failures according to another embodiment of the application.
Figure 4B:
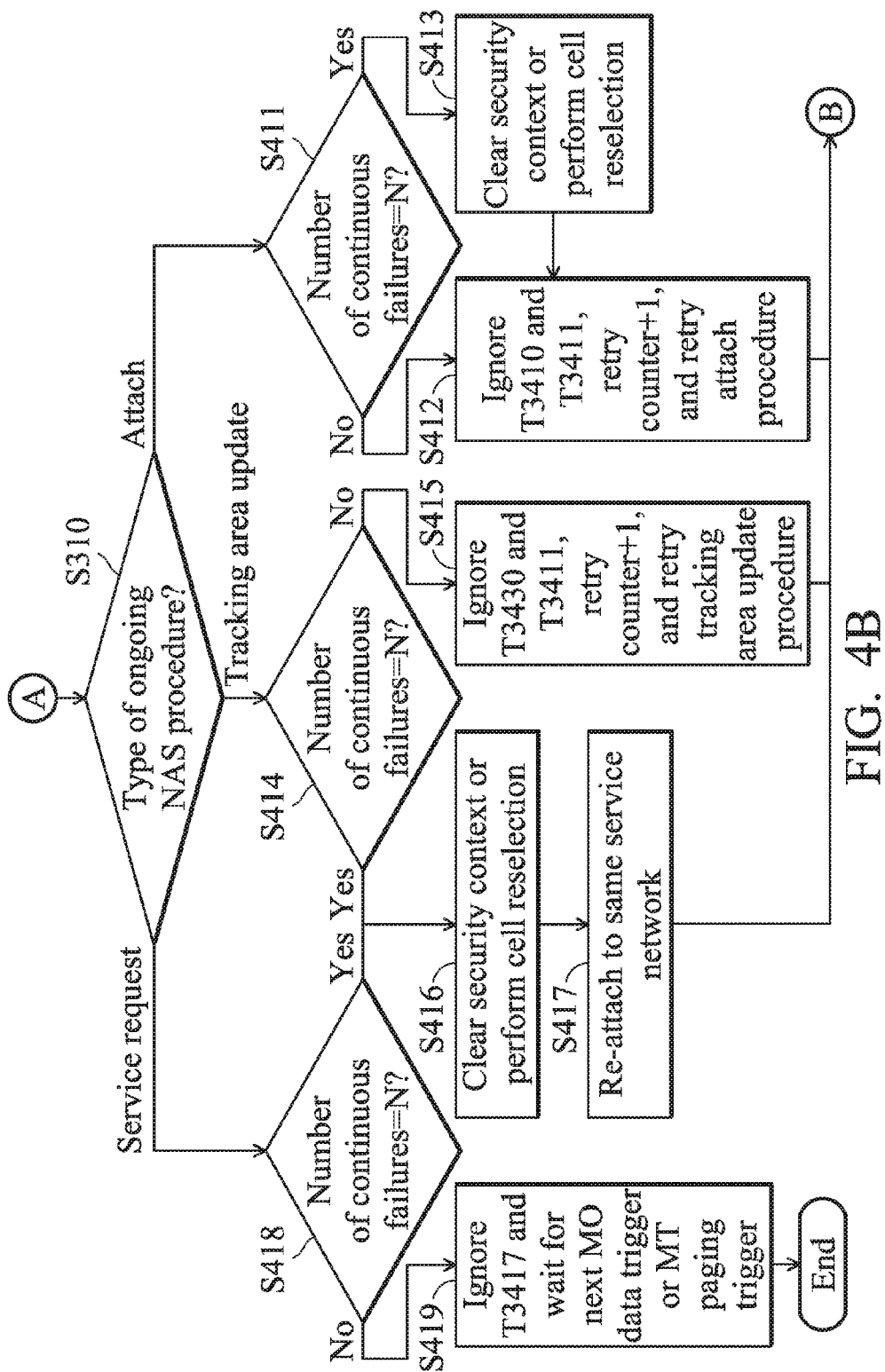

FIGS. 4A and 4B show a flow chart illustrating the method for recovering from security mode command failures according to another embodiment of the application. In this embodiment, steps S301 to S310 are the same as those described in the embodiment of FIGS. 3A and 3B; and thus, the related descriptions are omitted for brevity. Subsequent to step S310, if the NAS procedure is an attach procedure, the mobile communication device determines whether the number of continuous failures of the integrity protection check of the SECURITY MODE COMMAND message or the transmission of the SECURITY MODE COMPLETE message is equal to a predetermined threshold (denoted as N in FIG. 4B) (step S411). In one embodiment, the predetermined threshold is set to a value less than the maximum number of retries (e.g., less than 5). If the number of continuous failures is less than the predetermined threshold, the mobile communication device ignores the guard timer, T3410, and the retry timer, T3411, increments the retry counter, and immediately retries the attach procedure (step S412), and the method flow goes to step S302. Otherwise, if the number of continuous failures is equal to the predetermined threshold, the mobile communication device clears the security context or performs cell reselection (step S413), and the method flow goes to step S412. Specifically, the mobile communication device should exclude the current serving cell during the cell reselection at least for a certain period of time, so that the mobile communication device may successfully reselect to another cell.

Subsequent to step S310, if the NAS procedure is an attach procedure, the mobile communication device determines whether the number of continuous failures of the integrity protection check of the SECURITY MODE COMMAND message or the transmission of the SECURITY MODE COMPLETE message is equal to a predetermined threshold (step S414). In one embodiment, the predetermined threshold is set to a value less than 5. If the number of continuous failures is less than the predetermined threshold, the mobile communication device ignores the guard timer, T3430, and the retry timer, T3411, increments the retry counter, and immediately retries the tracking area update procedure (step S415). Otherwise, if the number of continuous failures is equal to the predetermined threshold, the mobile communication device clears the security context or performs cell reselection (step S416), and then re-attaches to the service network, i.e., performs an attach procedure (step S417). Specifically, during the cell reselection, the mobile communication device should exclude the current serving cell at least for a certain period of time, so that the mobile communication device may successfully reselect to another cell. Subsequent to steps S415 and S417, the method flow goes to step S302.

Subsequent to step S310, if the NAS procedure is a service request procedure, the mobile communication device determines whether the number of continuous failures of the integrity protection check of the SECURITY MODE COMMAND message or the transmission of the SECURITY MODE COMPLETE message is equal to a predetermined threshold (step S418). In one embodiment, the predetermined threshold is set to a value less than 5. If the number of continuous failures is less than the predetermined threshold, the mobile communication device ignores the guard timer, T3417, and waits for the next MO data trigger or MT paging trigger for initiating the service request procedure (step S419), and the method ends.

In view of the forgoing embodiments of FIGS. 3A, 3B, 4A, and 4B, it will be appreciated that the present application realizes fast recovery from security mode command failures by allowing the mobile communication device to retry the ongoing NAS procedure without being delayed by the guard timer and/or retry timer. Advantageously, this greatly reduces the time to regain service from the service network.

Please note that other detailed descriptions of the attach/tracking area update/service request procedure and the RRC security activation procedure are omitted herein for brevity since it is beyond the scope of the application, and references may be made to the 3GPP TS 36.331 and TS 24.301.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A mobile communication device, comprising:
a wireless transceiver, configured to perform wireless transmission and reception to and from a service network; and
a controller, configured to determine, during an ongoing Non-Access Stratum (NAS) procedure, whether a SECURITY MODE COMMAND message received from the service network via the wireless transceiver fails an integrity protection check and no RRC CONNECTION RELEASE message has been received from the service network via the wireless transceiver, or whether transmission of a SECURITY MODE COMPLETE message to the service network via the wireless transceiver has failed, and locally release a connection to the service network when the SECURITY MODE COMMAND message fails the integrity protection check and no RRC CONNECTION RELEASE message has been received, or when the transmission of the SECURITY MODE COMPLETE message has failed.

2. The mobile communication device of claim 1, wherein the controller is further configured to determine a number of continuous failures of the integrity protection check of the SECURITY MODE COMMAND message or the transmission of the SECURITY MODE COMPLETE message, and clear security context or perform cell reselection which excludes a current serving cell at least for a period of time, when the number of continuous failures is equal to a predetermined threshold.

3. The mobile communication device of claim 2, wherein, when the number of continuous failures is equal to the predetermined threshold, the controller is further configured to re-attach to the service network via the wireless transceiver in response to the NAS procedure being a tracking area update procedure or a service request procedure.

4. The mobile communication device of claim 1, wherein, in response to the NAS procedure being an attach procedure or a tracking area update procedure, the controller is further configured to retry the NAS procedure subsequent to the local release of the connection, without waiting for a guard timer and a retry timer of the NAS procedure to expire.

5. The mobile communication device of claim 1, wherein, in response to a Mobile Originated (MO) data trigger or Mobile Terminated (MT) paging trigger and the NAS procedure being a service request procedure, the controller is further configured to initiate the NAS procedure subsequent to the local release of the connection, without waiting for a guard timer of the NAS procedure to expire.

6. A method for recovering from security mode command failures, which is executed by a mobile communication device wirelessly communicating with a service network, the method comprising:
determining, during an ongoing Non-Access Stratum (NAS) procedure, whether a SECURITY MODE COMMAND message received from the service network fails an integrity protection check and no RRC CONNECTION RELEASE message has been received from the service network, or whether transmission of a SECURITY MODE COMPLETE message to the service network has failed; and
locally releasing a connection to the service network when the SECURITY MODE COMMAND message fails the integrity protection check and no RRC CONNECTION RELEASE message has been received, or when the transmission of the SECURITY MODE COMPLETE message has failed.

7. The method of claim 6, further comprising:
determining a number of continuous failures of the integrity protection check of the SECURITY MODE COMMAND message or the transmission of the SECURITY MODE COMPLETE message; and
clearing security context or performing cell reselection which excludes a current serving cell at least for a period of time, when the number of continuous failures is equal to a predetermined threshold.

8. The method of claim 7, further comprising:
when the number of continuous failures is equal to the predetermined threshold, re-attaching to the service network in response to the NAS procedure being a tracking area update procedure or a service request procedure.

9. The method of claim 6, further comprising:
in response to the NAS procedure being an attach procedure or a tracking area update procedure, retrying the NAS procedure subsequent to the local release of the connection, without waiting for a guard timer and a retry timer of the NAS procedure to expire.

10. The method of claim 6, further comprising:
in response to a Mobile Originated (MO) data trigger or Mobile Terminated (MT) paging trigger and the NAS procedure being a service request procedure, initiating the NAS procedure subsequent to the local release of the connection, without waiting for a guard timer of the NAS procedure to expire.

11. A mobile communication device, comprising:
a wireless transceiver, configured to perform wireless transmission and reception to and from a service network; and
a controller, configured to determine, during an ongoing Non-Access Stratum (NAS) procedure, whether a SECURITY MODE COMMAND message received from the service network via the wireless transceiver fails an integrity protection check and an RRC CONNECTION RELEASE message has been received from the service network via the wireless transceiver, and when the SECURITY MODE COMMAND message fails the integrity protection check and the RRC CONNECTION RELEASE message has been received, release a connection to the service network according to the RRC CONNECTION RELEASE message and retry the NAS procedure without waiting for one or more timers associated with the NAS procedure to expire.

12. The mobile communication device of claim 11, wherein the controller is further configured to determine a number of continuous failures of the integrity protection check of the SECURITY MODE COMMAND message or the transmission of the SECURITY MODE COMPLETE message, and clear security context or perform cell reselection which excludes a current serving cell at least for a period of time, when the number of continuous failures is equal to a predetermined threshold.

13. The mobile communication device of claim 12, wherein, when the number of continuous failures is equal to the predetermined threshold, the controller is further configured to re-attach to the service network via the wireless transceiver in response to the NAS procedure being a tracking area update procedure or a service request procedure.

14. The mobile communication device of claim 12, wherein, when the number of continuous failures is less than the predetermined threshold, the one or more timers comprise a guard timer and a retry timer of the NAS procedure which is an attach procedure or a tracking area update procedure.

15. The mobile communication device of claim 12, wherein, when the number of continuous failures is less than the predetermined threshold, the one or more timers comprise a guard timer of the NAS procedure which is a service request procedure, and the retry of the NAS procedure is performed in response to a Mobile Originated (MO) data trigger or Mobile Terminated (MT) paging trigger.

16. A method for recovering from security mode command failures, which is executed by a mobile communication device wirelessly communicating with a service network, the method comprising:
determining, during an ongoing Non-Access Stratum (NAS) procedure, whether a SECURITY MODE COMMAND message received from the service network fails an integrity protection check and an RRC CONNECTION RELEASE message has been received from the service network; and
releasing a connection to the service network according to the RRC CONNECTION RELEASE message and retrying the NAS procedure without waiting for one or more timers associated with the NAS procedure to expire, when the SECURITY MODE COMMAND message fails the integrity protection check and the RRC CONNECTION RELEASE message has been received.

17. The method of claim 16, further comprising:
determining a number of continuous failures of the integrity protection check of the SECURITY MODE COMMAND message or a transmission of the SECURITY MODE COMPLETE message; and
clearing security context or performing cell reselection which excludes a current serving cell at least for a period of time, when the number of continuous failures is equal to a predetermined threshold.

18. The method of claim 17, further comprising:
when the number of continuous failures is equal to the predetermined threshold, re-attaching to the service network in response to the NAS procedure being a tracking area update procedure or a service request procedure.

19. The method of claim 17, wherein, when the number of continuous failures is less than the predetermined threshold, the one or more timers comprise a guard timer and a retry timer of the NAS procedure which is an attach procedure or a tracking area update procedure.

20. The method of claim 17, wherein, when the number of continuous failures is less than the predetermined threshold, the one or more timers comprise a guard timer of the NAS procedure which is a service request procedure, and the retry of the NAS procedure is performed in response to a Mobile Originated (MO) data trigger or Mobile Terminated (MT) paging trigger.

* * * * *